W. F. COCHRANE.
Processes for Manufacturing Flour.
No. 5,841. Reissued April 21, 1874.
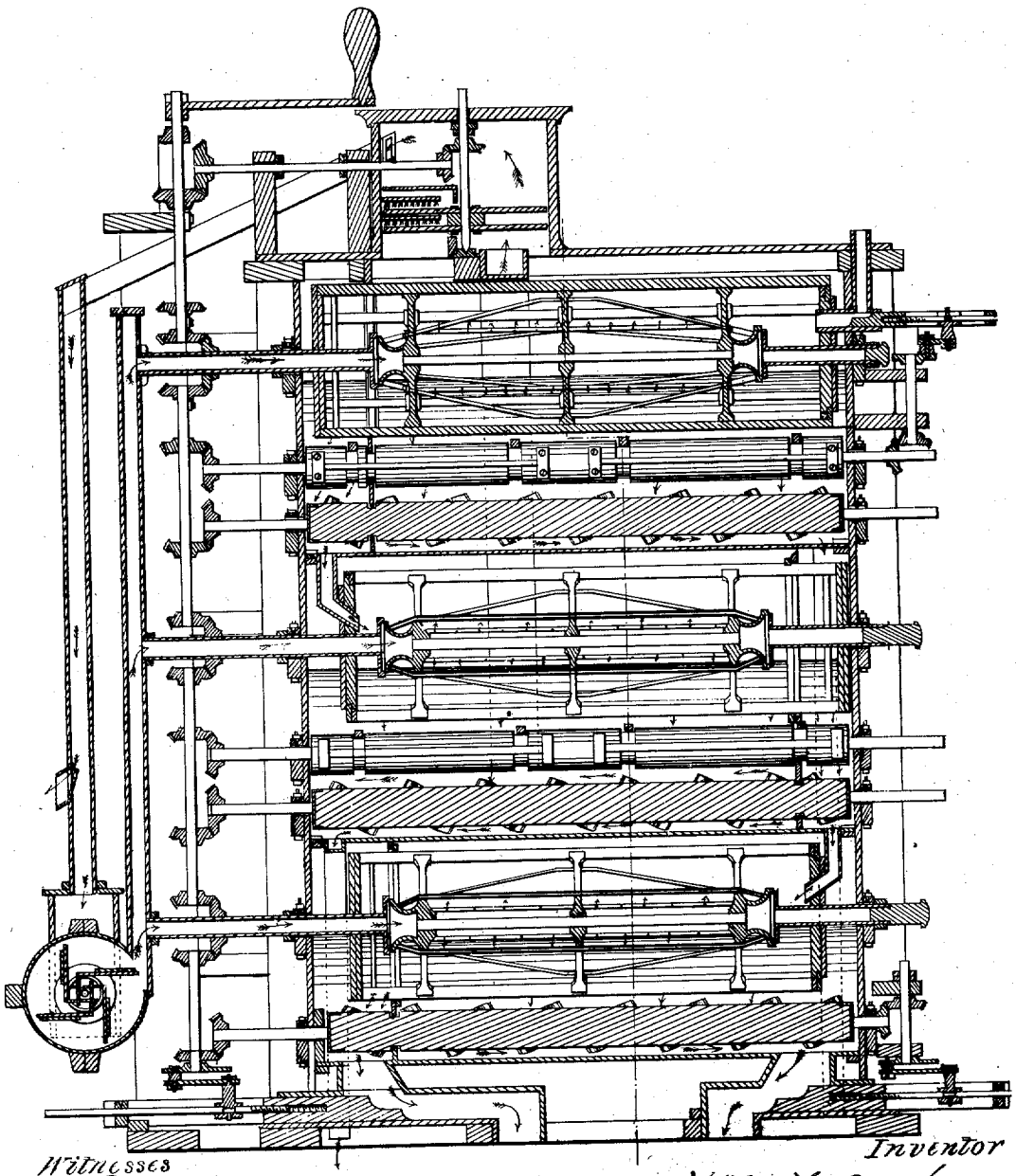
Witnesses
A. Ruppert
John M. Smith
Inventor
Wm F. Cochrane
per
D. P. Holloway & Co Attys.

UNITED STATES PATENT OFFICE.

WILLIAM F. COCHRANE, OF LA FAYETTE, IND., ASSIGNOR, BY MESNE ASSIGNMENTS, TO HIMSELF, BENJAMIN H. WARDER, AND RODNEY MASON.

IMPROVEMENT IN PROCESSES FOR MANUFACTURING FLOUR.

Specification forming part of Letters Patent No. 37,317, dated January 6, 1863; reissue No. 5,841, dated April 21, 1874; application filed March 4, 1874.

*To all whom it may concern:*

Be it known that I, WILLIAM F. COCHRANE, of La Fayette, in the county of Tippecanoe and State of Indiana, formerly of Springfield, in the county of Clarke and State of Ohio, have invented a new and useful Improvement in the Art of Manufacturing Flour, of which the following is a specification:

In manufacturing flour, as heretofore practiced, the meal, after being ground, has generally been conveyed to a cooler, from which, after it had given up a portion of the heat it had acquired in grinding, it was spouted into the head of a reel clothed with wire or silk bolting-cloth, of a sufficient degree of fineness to permit the sifting through of the fine particles, and prevent the escape of the coarser ones. As the meal was agitated in the bolt, the (specifically) heavier particles would naturally sink to the bottom, while the (specifically) lighter particles would remain on top. Owing to this, the fine (specifically) heavier particles first passed through the meshes of the cloth, constituting what was graded as superfine flour. As the meal traveled along the surface of the bolting-cloth, it very soon became impoverished of the heavy particles of flour, until, by the time that it reached a point rarely, if ever, farther than the middle of the first reel, the impoverishment was so complete that the lighter impurities began to pass in such quantities as to reduce the grade of the flour below the standard. At this point the flour passing through was cut off, and what passed through the remainder of the first and the whole of the second reel (where a second reel was used) was called "returns," and was carried back either to the hopper-boy and mingled with the fresh meal, or spouted in with the latter into the head of the first reel. By this mode of operation, it is manifest that the meal under treatment in the bolts at any given time after the introduction of the returns contained more than its natural quantity of impurities, so that the system of returns, while it increased the yield, reduced the merchantable quality of the flour, as there would necessarily be more speck in flour thus made than in flour made from the freshly-ground meal in its natural condition as it came from the stones. As the process of impoverishment continued, the material passing through the bolt would become so impure as to be unfit for returns, and at this point another cloth of coarser meshes was introduced, in passing the meal over which the portion of the meal called "middlings" was separated. These middlings consisted of the coarser particles of the flour-producing part of the berry not ground fine enough to pass through the meshes of the finer bolting-cloth with the superfine flour, mixed with a large proportion of pulverulent impurities, resulting from pulverizing portions of the hull of the berry. When the middlings had been taken off, the meal passed onto a still coarser cloth, which separated the "ships" or "ship-stuff." Then another still coarser cloth separated the "shorts," and the "bran" passed off at the tail of the reel. The middlings, ships, shorts, and bran were generally disposed of as "feed." In some mills the middlings were disposed of for purposes of distillation, and in a comparatively few mills the middlings were reground, and either sold as a very inferior grade of flour, or part of the middlings-flour was mixed with the superfine flour in such proportions as could be done without reducing the total product below the standard.

Many plans had been suggested for improving the quality of flour, and among them the use of currents of air, to be admitted into the interior of the reel through hollow perforated shafts; but, in all the various modes of milling, the end sought for was to keep back the speck, and make the largest possible amount of superfine flour, after which the separations of the offal were immediately made without attempting its purification. After the middlings were reground, the middlings-meal was bolted, to improve, if possible, the quality of the middlings flour. As, however, the portion of the hull which formed the speck and dust is very brittle, and by the first grinding made as fine as the flour itself, and capable of passing through the meshes of any cloth through which the flour could be bolted, by regrinding it was only made still finer, and therefore the difficulty of separating it from the valuable portions of the middlings-meal increased.

Another and entirely distinct mode of milling was known as "high" milling. In this mode the grain, when first passed between the stones, was not ground into meal, but merely broken, so that the kernel should be separated from the hull. Separation was then made by means of blasts of air and sieves, and the coarser particles were again and again passed between the stones, and subjected to the action of the sieves and blast until the hard flour-producing portions of the berry could be separated from the hull and then ground into flour.

My invention relates only to the ordinary mode of milling, in which the wheat is reduced to meal by grinding at the beginning of the operation, and then the superfine flour is next separated from the meal. I include under the general term "superfine" flour the flour separated from the meal before the returns are taken out of the meal. Grades of flour were known under the name of "extra" or "fancy;" but prior to the time of my invention these higher grades were made generally by the use of the highest quality of wheat, or by taking off a small portion of the superfine flour which first passed at the head of the reel, and was, therefore, freest from speck and other impurities. The object of my invention was to increase the production of the best quality of flour; and my improvement consisted in separating from the meal first the superfine flour, and then the pulverulent impurities mingled with the flour-production portions of the middlings-meal, so as to make "white" or "purified" middlings, which, when reground and rebolted, would yield pure white flour, which, when added to the superfine, would improve the quality of the flour resulting from their union, instead of deteriorating its quality, as had theretofore been the case when the middlings-flour was mingled with the superfine.

I have shown in the accompanying drawings, and in Letters Patent of the United States issued January 6, 1863, and numbered 37,318, 37,319, 37,320, and 37,321, an improved plan of bolting-chests, incorporating means necessary for carrying into operation my improvement in the art of manufacturing flour. Machines constructed as set forth in said Letters Patent are well adapted to work my improvements in the art of manufacturing flour, but, being made the subjects of said patents, are not designed to be covered by this patent, which relates to the improved mode of manufacture, and is not limited to any special arrangement of machinery by which my improved process may be operated. As my process is worked in said machine, the wheat, having first been ground in the ordinary manner, is introduced into the head of the first of a series of bolting-reels, clothed with cloths of progressively-finer meshes, and having introduced into their interior blasts of air, carried through hollow shafts, and discharged through pipes perforated with small holes, and so disposed that the force of the blast shall be caused to act close to the surface of the bolting-cloth. The succession of finer cloths tends to delay the escape of the finer and lighter particles until the specifically heavier particles have passed through, constitituting the superfine flour. The extent of the series of fine cloths is such that in said machines, after the superfine flour has been taken out, there being no longer enough remaining to keep other equally fine but specifically lighter particles away from the cloth, they will, before the meal has reached the tail of the last reel in the series, also pass through its meshes. Instead of "returning" this impure pulverulent material (as in ordinary modes of manufacture) to the head of the first reel, to be mingled with the freshly-ground meal, provision is made in my said machines for carrying it away and storing it separately.

Another agency is at the same time made to assist in the operation of separating the pulverulent impurities from the flour-producing portions of the meal, and thus made to contribute to the accomplishment of my improved mode of manufacture. There is continually a bed of meal in the bottom of the reels, which is in constant agitation as it is lifted up and falls back with the revolution of the reels. As the air-pipes come in succession to their lowest position, they will direct their jets against this mass, and through the falling particles carried up by and falling back from the revolving cloth. These jets, acting on the mass of meal, will separate the specifically lighter particles, and hold them in suspension, carrying away more or less of the finer and lighter particles through the meshes of the cloth, with the currents which are constantly ascending and passing out at the top of the bolting-chest, which is open, while the floor and sides of each reel-compartment are made close. When the residue of the meal is delivered at the tail of the last reel in the series, it is then carried into a separator-reel, clothed in the ordinary manner with cloths of increasing coarseness, and separated into middlings, ships, shorts, and bran. As all these divisions are to some extent arbitary and only approximate, some of the finest of the ship-stuff will be mingled with the white middlings, but the character of the middlings will be found to differ from the brown middlings produced by former modes of manufacture, these being white middlings mingled with particles of the coarser offal, having been purified by the separation of the finer pulverulent particles in the treatment of the meal in the first series of reels.

It is this intermediate treatment (between the separation of the superfine flour and the completion of the middlings-flour by regrinding and rebolting) for the separation and removal of the pulverulent impurities, which distinguishes my improvement in the art from all before-known modes of manufacture.

The white or purified middlings thus obtained are then reground and rebolted through a series of reels, in all respects like the first-described ones, in the following manner: At the tail of the first reel of this series the offal is drawn off, and the middlings-flour which has passed through the meshes of the first reel, is mingled with a suitable amount of coarse offal from the separator and passed through the second and third reels, which are clothed with finer and finer cloths. The finished middlings-flour is here separated, and the remaining offal passing out at the tail of the last reel, is returned to the separator, and the middlings-flour run into a chest by itself, to be either sold separately or mingled with the superfine flour. The offal delivered at the tail of the first middlings-reel, made up of the impurities of the white middlings as they come from the separator, is finished offal and spouted away to the feed-pile. The coarse offal mingled with the middlings-flour, as produced on the first middlings-reel, is added for the purpose of lightening it up, as without the addition of such offal it would not bolt properly.

By this means I produce middlings-flour—not the dark impure flour heretofore known as middlings-flour, but a flour which may be mingled with the superfine flour first taken out or sold separately.

What I claim as my invention, and desire to secure by Letters Patent, as an improvement in the art of manufacturing flour, is—

The hereinbefore-described process for manufacturing flour from the meal of ground wheat, by first taking out the superfine flour, and then taking out the pulverulent impurities by subjection to the combined operations of screening and blowing and afterward regrinding and rebolting the purified middlings.

In testimony that I claim the foregoing I have hereunto set my hand this 26th day of December, 1873.

WM. F. COCHRANE.

Witnesses:

R. MASON,

THOS. C. CONNOLLY.